(12) United States Patent
Slikkerveer et al.

(10) Patent No.: US 8,581,692 B2
(45) Date of Patent: Nov. 12, 2013

(54) ELECTRONIC SYSTEM AND METHOD OF OPERATING AN ELECTRONIC SYSTEM

(75) Inventors: Peter Slikkerveer, Waalre (NL); Susanne Burfeind, Hamburg (DE)

(73) Assignee: NXP B.V., Eindhoven (NL)

( * ) Notice: Subject to any disclaimer, the term of this patent is extended or adjusted under 35 U.S.C. 154(b) by 470 days.

(21) Appl. No.: 12/743,006

(22) PCT Filed: Nov. 12, 2008

(86) PCT No.: PCT/IB2008/054729
§ 371 (c)(1),
(2), (4) Date: May 14, 2010

(87) PCT Pub. No.: WO2009/063406
PCT Pub. Date: May 22, 2009

(65) Prior Publication Data
US 2011/0115756 A1    May 19, 2011

(30) Foreign Application Priority Data

Nov. 14, 2007   (EP) .................................... 07120686

(51) Int. Cl.
*G05B 19/00*    (2006.01)
(52) U.S. Cl.
USPC ......... 340/5.6; 340/5.61; 340/5.65; 340/10.1; 340/10.2; 340/10.3; 340/10.31; 340/10.32; 340/10.33; 340/10.34; 340/10.4; 340/10.41; 340/10.42; 340/10.5; 340/10.51; 340/10.52; 340/10.6
(58) Field of Classification Search
USPC ............. 340/5.6, 5.61, 6.64, 5.65, 10.1–10.6, 340/572.1–572.9; 705/39, 64
See application file for complete search history.

(56) References Cited

U.S. PATENT DOCUMENTS 5,307,411 A * 4/1994 Anvret et al. .................. 713/169
5,508,754 A * 4/1996 Orphan .......................... 348/722
(Continued)

FOREIGN PATENT DOCUMENTS

DE   19960647 A1 *  6/2001   ............. H04M 1/02
EP   1 107 504 A2    6/2001
(Continued)

OTHER PUBLICATIONS

Shimizu, Akihiro; "A Dynamic Password Authentication Method Using a One-Way Funcation"; Systems & Computers in Japan, Wiley, Hoboekn, NJ, US; vol. 22, No. 7; pp. 32-40 (Jan. 1, 1991).

*Primary Examiner* — George Bugg
*Assistant Examiner* — Paul Obiniyi

(57) ABSTRACT

In a method of operating an electronic system (1) a first device (3) of the electronic system (1) sends a message to a second device (6) of the electronic system (1). The second device (6) receives the message, generates a first value utilizing a first function based on at least parts of the history of at least parts of messages previously received at the second device (6), and stores the first value in a memory (8) of the second device (6). The first value is compared 5 with a second value generated at the first device (3), wherein the second value utilizes a second function based on at least parts of the history of at least parts of messages previously sent from the first device (3) to the second device (6). The first and second values are evaluated, and a signal is generated if the evaluating of the first and second values indicates that the history—of the messages previously received at the second device (6) differs from the 10 history of messages previously sent from the first device (3).

18 Claims, 2 Drawing Sheets

(56) References Cited

U.S. PATENT DOCUMENTS

| | | | |
|---|---|---|---|
| 5,727,153 A * | 3/1998 | Powell | 235/375 |
| 5,742,680 A * | 4/1998 | Wilson | 380/227 |
| 5,878,143 A | 3/1999 | Moore | |
| H1794 H * | 4/1999 | Claus | 235/380 |
| 5,979,773 A * | 11/1999 | Findley et al. | 235/492 |
| 6,092,133 A * | 7/2000 | Erola et al. | 710/301 |
| 6,367,014 B1 * | 4/2002 | Proust et al. | 713/182 |
| 6,397,060 B1 * | 5/2002 | Oikawa | 455/420 |
| 6,424,947 B1 * | 7/2002 | Tsuria et al. | 705/1.1 |
| 6,970,852 B1 * | 11/2005 | Sendo et al. | 705/67 |
| 7,139,694 B2 * | 11/2006 | Horn et al. | 705/64 |
| 7,156,313 B2 | 1/2007 | Ou et al. | |
| 7,302,446 B1 * | 11/2007 | Boothby | 707/610 |
| 7,337,332 B2 * | 2/2008 | Tsuria et al. | 713/193 |
| 7,360,091 B2 * | 4/2008 | Aikawa et al. | 713/172 |
| 7,436,291 B2 * | 10/2008 | Sellars et al. | 340/500 |
| 7,515,911 B2 * | 4/2009 | Ebata | 455/445 |
| 7,523,146 B2 * | 4/2009 | Holt et al. | 1/1 |
| 7,716,386 B1 * | 5/2010 | Vasquez et al. | 710/19 |
| 7,726,568 B2 * | 6/2010 | Singh et al. | 235/451 |
| 7,747,861 B2 * | 6/2010 | Mishra et al. | 713/172 |
| 7,801,486 B2 * | 9/2010 | Barnier | 455/41.2 |
| 7,933,840 B2 * | 4/2011 | Zank | 705/64 |
| 8,161,147 B2 * | 4/2012 | Verma et al. | 709/223 |
| 8,188,853 B2 * | 5/2012 | Galli et al. | 340/538 |
| 8,201,749 B2 * | 6/2012 | Singh et al. | 235/492 |
| 8,243,312 B2 * | 8/2012 | Kasatani | 358/1.15 |
| 8,245,942 B2 * | 8/2012 | Dischamp et al. | 235/492 |
| 2002/0152177 A1 * | 10/2002 | Wolf | 705/64 |
| 2002/0156746 A1 * | 10/2002 | Horn et al. | 705/64 |
| 2003/0050898 A1 * | 3/2003 | Oppat et al. | 705/64 |
| 2003/0154165 A1 * | 8/2003 | Horn et al. | 705/39 |
| 2003/0182228 A1 * | 9/2003 | Wolf | 705/39 |
| 2004/0002917 A1 * | 1/2004 | Horn et al. | 705/39 |
| 2004/0025021 A1 * | 2/2004 | Aikawa et al. | 713/172 |
| 2004/0030898 A1 * | 2/2004 | Tsuria et al. | 713/171 |
| 2005/0210283 A1 * | 9/2005 | Kato | 713/200 |
| 2006/0288053 A1 * | 12/2006 | Holt et al. | 707/203 |
| 2007/0018789 A1 * | 1/2007 | Yuhara | 340/5.72 |
| 2007/0071241 A1 | 3/2007 | Caprella et al. | |
| 2007/0106911 A1 * | 5/2007 | Mishra et al. | 713/193 |
| 2007/0157052 A1 * | 7/2007 | Sellars et al. | 714/15 |
| 2007/0255738 A1 * | 11/2007 | D'Costa | 707/101 |
| 2008/0027750 A1 * | 1/2008 | Barkeloo et al. | 705/1 |
| 2008/0148069 A1 * | 6/2008 | Tsuria et al. | 713/193 |
| 2008/0240126 A1 * | 10/2008 | Calahan et al. | 370/401 |
| 2008/0240399 A1 * | 10/2008 | Calahan et al. | 379/220.01 |
| 2009/0144343 A1 * | 6/2009 | Holt et al. | 707/203 |
| 2009/0237715 A1 * | 9/2009 | Kasatani | 358/1.15 |
| 2009/0270069 A1 * | 10/2009 | Plymoth et al. | 455/407 |
| 2010/0252638 A1 | 10/2010 | Slikkerveer et al. | |
| 2010/0276496 A1 | 11/2010 | Slikkerveer et al. | |
| 2011/0081951 A1 * | 4/2011 | Hwang | 455/558 |
| 2011/0101108 A1 | 5/2011 | Slikkerveer et al. | |
| 2011/0117909 A1 * | 5/2011 | Cao et al. | 455/423 |
| 2012/0235798 A1 * | 9/2012 | Singh et al. | 340/10.5 |

FOREIGN PATENT DOCUMENTS

| | | | |
|---|---|---|---|
| EP | 1496714 A1 * | 1/2005 | H04Q 7/32 |
| JP | 2000 285076 A | 10/2000 | |
| JP | 2000299698 A * | 10/2000 | H04L 12/54 |
| WO | 94/20929 | 9/1994 | |
| WO | 01/33317 A | 5/2001 | |
| WO | 2004/025921 A | 3/2004 | |

* cited by examiner

ELECTRONIC SYSTEM AND METHOD OF OPERATING AN ELECTRONIC SYSTEM

FIELD OF THE INVENTION

The invention relates to an electronic system and to a method of operating an electronic system.

BACKGROUND OF THE INVENTION

Such an electronic system is, for instance, a smart card. In general, a smart card is any pocket-sized card with an embedded integrated circuit that comprises a microcontroller which can process information. Smart cards can be categorized in accordance with different criteria. Particularly, smart cards can be categorized as memory-chip cards that comprise a relatively simple logic and as processor-chip cards that comprise, for instance, an operation system. Particularly processor-chip cards can receive an input signal which is processed, by way of an integrated circuit application, and deliver an output signal. Generally, smart cards can be contactless or contact smart cards, or can be a combination of both.

Smart cards may include a chip on their fronts. The chip may be made from gold and has a size of approximately 1 cm by 1 cm. The contact smart card may communicate with a reader. When inserted into the reader, electrical connectors of the reader contact the chip for reading information from and writing information back to the smart card. Since normally the smart card does not include a battery, energy is supplied to the contact chip card by the reader. Contact smart cards are, for instance, standardized by ISO/IEC 7816 or ISO/IEC 7810.

In a contactless smart card, the integrated circuit communicates with the reader in a contactless manner, for instance through Radio-frequency identification (RFID). Contactless smart cards are, for instance, standardized by ISO/IEC 14443 or ISO 15693. Contactless smart cards are also known as transponders which may or may not include an active energy source, such as a battery. Transponders not having a battery are also known as passive transponders and transponders comprising a battery are known as active transponders.

International application for patent No. 94/20929 discloses a smart card that comprises an electronic data memory, an interface means connected to the data memory, to allow access to a reader, and a data display operable to display information indicative of the contents of the data memory.

Smart cards may be used, inter alia, as banking cards, transportation ticketing, loyalty cards, or e-passports. Because of this, a relatively high security level against fraudulent tampering of the card must be assured. While the microcontroller of the smart card usually provides a secure environment, the integration of a display into the smart card and particularly information exchange between the microcontroller and a display driver configured to drive the display potentially increases the danger of fraud and tampering of the smart card.

OBJECT AND SUMMARY OF THE INVENTION

It is an object of the present invention to provide a method of operating an electronic system, such as a smart card, which method allows an improved secure operation between two devices within the electronic system.

Another object of the present invention is to provide an electronic system, such as a smart card, whose security level against fraudulent misuse is increased.

The object is achieved in accordance with the invention by means of a method of operating an electronic system, comprising the steps of:

sending a message from a first device of an electronic system to a second device of the electronic system;

receiving the message at the second device;

generating, at the second device, a first value utilizing a first function based on at least parts of the history of at least parts of messages previously received at the second device and storing the first value in a memory of the second device;

comparing the first value with a second value generated at the first device, the second value utilizing a second function based on at least parts of the history of at least parts of messages previously sent from the first device to the second device;

evaluating the first and second values; and generating a signal if the evaluating of the first and second values indicates that the history of the messages previously received at the second device differs form the history of messages previously sent from the first device.

The object is also achieved in accordance with the invention by means of an electronic system, comprising first and second devices and a memory embedded in the second device; wherein the first device is configured to send a message to the second device; the second device is configured to generate a first value utilizing a first function based on at least parts of the history of at least parts of messages previously received at the second device and to store the first value in its memory; the first device is configured to generate a second value utilizing a second function based on at least parts of the history of at least parts of messages previously sent from the first device; and the electronic system is configured to evaluate the first and second values and to generate a signal if the evaluating of the first and second values indicates that the history of the messages previously received at the second device differs form the history of messages previously sent from the first device.

The inventive electronic system comprises the first and second devices of which the first device sends the message to the second device. The first device may particularly be a so-called secure device, such as a secure microcontroller. A secure device in this context is a device which includes measurements against unauthorized access or tampering. This may be achieved, for instance, by a secure architecture of the first device. If the first device is such a secure device, it can be assumed at least with a relatively high degree of certainty that the message leaving the first device is un-tampered.

The second device may also be a microcontroller and is configured to receive the message from the first device. The second device may further be configured to perform an action based on the received message and to store the message in its memory. The memory may particularly be a non volatile memory and/or may be embedded into the second device. Embedding the memory into the second device may be achieved by forming the second device into a single integrated circuit which comprises the memory, but not the first device. The advantage of a non volatile memory is its capability not to loose its content when no power is available for the memory.

The second device may not be a secure device and, since the first and second devices may not be included into a single integrated circuit, communication between the first and second devices may be un-secure, resulting in an unauthorized alteration of the message received by the second device.

In order to detect such an alteration of the message, the second device generates the first value utilizing the first function. The first function is based on at least parts of the history of at least parts of messages previously received at the second device. The second device further stores the first value in its memory. The first value thus includes information about the history of messages received at the second device particularly up to the currently received message. The first device is configured to generate the second value that utilizes the second function which is based on at least parts of the history of at least parts of messages previously sent from the first device. The second value may be stored in a memory of the first device. Thus, the second value includes information about the history of messages sent from the first device particularly up to the currently sent message. Since the second device should receive the same messages as the first device sent to the second device, the first and second values should correlate. In other words, if the inventive electronic system detects in response to evaluating the first and second values that the history of the messages previously received at the second device differs form the history of messages previously sent from the first device, one of the messages may have been tampered and the electronic systems generates the signal.

The first and second functions may be identical, such that the first and second values are identical if the history of previously sent and previously received messages are identical. Then, only the first and second values need to be compared for their evaluating and the signal is generated if the first and second values differ.

In one embodiment, the first function is also based on at least parts of the message received at the second device and the second function is also based on at least parts of the message sent from the first device. Then, it can also be detected if the current message was altered.

In addition, the message may be stored in the memory of the second device before or after it performs its action. The evaluating of the first and second values may be executed by the first or by the second device. Thus, the inventive method my comprise sending the first value to the first device and evaluating the first and second values at the first device; or sending the second value to the second device and evaluating the first and second values at the second device.

The first device may, as mentioned above, be a secure microcontroller and generally a main device of the electronic system. The second device may be a peripheral device, such as a display driver or a display controller operatively coupled to a display of the electronic system, a keyboard controller and/or a fingerprint sensor controller. If the second device is a display controller or driver, then the message may include display information to be displayed by the display.

In one embodiment of the inventive electronic system, the electronic system is a smart card which comprises a smart card controller as the first device; a communication interface operatively coupled to the smart card controller, wherein the communication interface is configured to communicate with a reader; a display; and a display driver as the second device operatively coupled to the display. The smart card may, for instance, be configured to execute a plurality of write cycles during a communication with the reader and the message includes display information of the one of the write cycles, particularly the last write cycle of the plurality of write cycles to be displayed on the display. The information to be displayed may be calculated by the chip card controller with or without information of the reader. The information to be displayed may also be initiated by the reader. The memory of the second device may be a non volatile memory and the display driver may be formed by a single integrated circuit including the memory, but not the smart card controller or the communication interface. The smart card controller may be formed as a single integrated circuit comprising a smart card memory and potentially the communication interface or at least parts of the communication interface. The smart card may be a contact smart card configured to communicate with a reader in a contactbound manner, a contactless smart card configured to communicate with a reader in a contactless manner, or a combination of both.

There are many ways to manipulate a smart card, generally an electronic system. For instance, the internal communication flow between different parts of the smart card can be altered utilizing, for instance, laser light, or the process of the smart card controller can be aborted before a current communication with, for instance, a reader has been completed. In both cases, the smart card may be tampered such that it displays manipulated display content for the purpose of, for instance, committing fraud. In response to the generated signal, information about having detected that the history of the messages previously received at the second device differs form the history of messages previously sent from the first device may be displayed, the electronic system may be reset, information about having detected that the history of the messages previously received at the second device differs from the history of messages previously sent from the first device may be conveyed and/or a communication of the electronic system with a third device external to the electronic system may be aborted. The third device may be the reader such that the latter can be used, for instance, to trigger different actions, for example, ask for additional security, such as identification of the user of the smart card, or trigger replacement of the smart card.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

Figure 1:
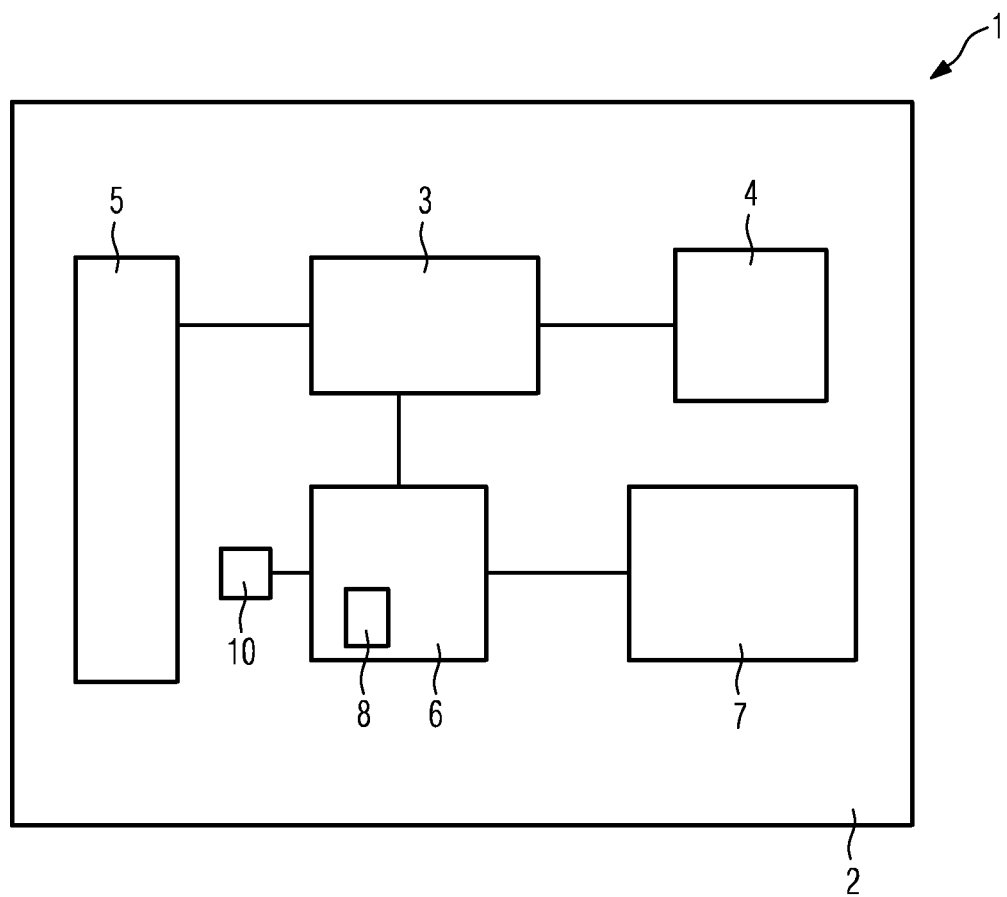
FIG. 1 is a smart card comprising a smart card controller and a display driver.

FIG. 1 shows a smart card 1 as an example of an electronic system which is comprised of first and second devices communicating with each other. The smart card 1 comprises a substrate 2 made, for instance, from plastic, a smart card controller 3 as an example of a first device, a smart card memory 4 operatively coupled to the smart card controller 3, a communication interface 5 operatively coupled to the smart card controller 3, a display driver 6 as an example of a second device operatively coupled to the smart card controller 3, and a display 7 driven by the display driver 6. The smart card memory 4, which may be an EEPROM, the smart card controller 3, and at least parts of the communication interface 5 may be integrated into a single integrated circuit.

For the exemplary embodiment, the smart card 1 is intended to communicate with a reader 9 utilizing the communication interface 5. Particularly, the smart card 1 may be a contact smart card, a contactless smart cart, or a combination of both.

If the smart cart 1 is designed to communicate with the reader 9 in contactbound manner, then its communication interface 5 is a contactbound interface. Then, the smart card 1 may be inserted into the reader 9 for communication, and a communication interface of the reader 9 contacts the communication interface 5 of the smart card 1. Additionally, electric energy for the smart card 1 may be delivered to the smart card 1 from the reader 1 via the communication interfaces.

If the smart cart 1 is designed to communicate with the reader 9 contactlessly, then its communication interface 5 is a contactless interface comprising, for instance, an antenna. Then, the smart card 1 may communicate with the reader 9 through Radio-frequency identification or be powered by the field emitted by the reader 9 as it is per se known in the art.

Additionally, as illustrated in FIG. 1, the smart card 1 may comprise a rechargeable or a non-rechargeable battery 10 particularly powering the display driver 6 when the smart card 1 is not operatively coupled to the reader 9.

For the exemplary embodiment, the smart card controller 3 controls this communication when communicating with the reader 9. The communication comprises a plurality of write cycles during which the smart card controller 3 writes data on the smart card memory 4.

Figure 2:
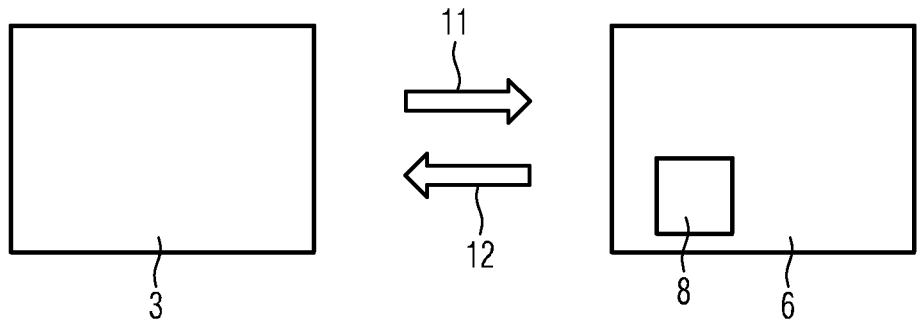
FIGS. 2 to 4 are charts illustrating different embodiments of communication procedures between the smart card controller and the display driver.

Furthermore, the smart card 1 is configured to display display information on the display 7. In order to display the display information, the smart card controller 3 sends a message to the display driver 6 which drives the display 7 to show the display information of the message. The message received by the display driver 6 may be tampered. In order to detect an altered message, the smart card 1 implements the following security mechanism which is illustrated in FIG. 2.

The smart card controller 3 sends a message m to the display driver 6. This is indicated in FIG. 2 by an arrow 11. The message m comprises display information to be displayed by the display 7. The display driver 6 drives the display 7 such that the display 7 displays the display information of message m. Before, after or simultaneously to driving the display 7, the display driver 6 stores the message m in its memory 8.

Furthermore, the display driver 6 stores a history of received messages in its memory 8. For the exemplary embodiment, this history is calculated from an old history ($history_{old}$) and the message m, for instance, by a collision resistant one-way-function:

$$history = f(m, history_{old})$$

The old history is also stored in the memory 8 and reflects the history of previously received messages at the display driver 6 before receiving the message m (The old history can be replaced by the new history). Consequently, the current history always includes all display information displayed so far.

For the exemplary embodiment, the display driver 6 sends the history ($= f(m, history_{old})$) to the smart card controller 3. This is indicated in FIG. 2 by an arrow 12. The smart card controller 3 then validates the history of the driver display 6 by comparing the history calculated by the display driver 6 with a history of messages it sent to the display driver 6. By this, the smart card controller 3 checks, whether there have been wrong values received by the display driver 6, induced, for instance, by an attack.

If, for instance, an attacker simulates the smart card controller 3 and causes the display driver 6 to display another display information of a simulated message, the driver display 6 calculates a new history, comprising the simulated message. Since also the following histories depend on this simulated history, the smart card controller 3 will detect the attack during a later communication with the display driver 6 when comparing its calculated history with the history calculated by the display driver and the smart card controller 3 can react appropriately.

The communication between the smart card controller 3 and the display driver 6 can be secured, for example, by a MAC or an encryption of the communication.

Therefore, basically the history, or at least a function of the history, of messages having been received by the display driver 6 or having been displayed by the display 7 so far is stored in the memory 8 of the display driver 6. This history is utilized for the detection of tamper attacks. By this, the smart card controller 3 can control if the display driver 6 has had a wrong value since their last communication, even with a switch off of the power supply in between, if the memory 8 is non volatile.

For the exemplary embodiment, the smart card controller 3 generates a signal if its calculated history differs from the calculated history received from the display driver 6. In response to the signal, the smart card 1 may initiate an appropriate action, such as a complete or a temporary service denial of the smart card 1.

If a complete service denial is initiated, then the smart card 1 stops working in response to the generated signal.

If a temporary service denial is initiated, then basically the smart card 1 does not perform the desired action.

The smart card 1 may also continue operation, but communicates the attack to a backend system via the reader 9. The backend system can then decide on the follow-up, for instance replacing the smart card 1 by another smart card, or demanding additional security measures.

To allow the latter two reactions, it is needed for the smart card 1 to synchronize the history of the driver display 6 and the history of the smart card controller 3. In terms of security, this may be achieved by resetting the history stored in the memory 8 of the display driver 6 utilizing a non-secured command, since the history at the smart card controller 3 cannot be reset through the interface connecting the smart card controller 3 and the display driver 3.

It is also not necessary to transfer the complete history. It is also possible to transfer a result of a function on this history.

Figure 3:
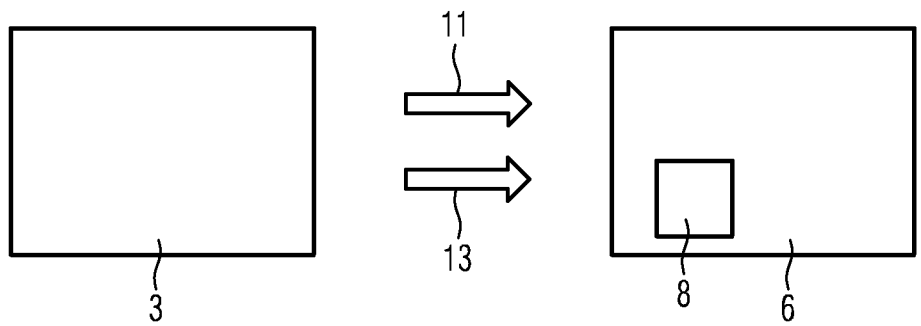

FIG. 3 illustrates an alternative embodiment of the communication between the smart card controller 3 and the display driver 6. The smart card controller 3 sends the message m to the display driver 6, as indicated by the arrow 11. The display driver 6 drives the display 7 such that the display 7 displays the display information of message m. Before, after or simultaneously to driving the display 7, the display driver 6 stores the message m in its memory 8. Furthermore, the display driver 6 stores the history of received messages in its memory 8. For the exemplary embodiment, this history is also calculated from the old history ($history_{old}$) and the message m by, for instance a collision resistant one-way-function:

$$history = f(m, history_{old})$$

The smart card controller 3 also sends its own history ($history_{controller}$) to the display driver 3. This is indicated in FIG. 3 by an arrow 13. Then, the display driver 3 validates the history of the smart card controller 3 ($history_{controller}$) by comparing the history calculated by the display driver 6 with a history calculated by the smart card controller 3. By this, the display driver 6 checks, whether is has received wrong values induced, for instance, by an attack. It is also not necessary to transfer the complete history. It is also possible to transfer a result of a function on this history.

Figure 4:
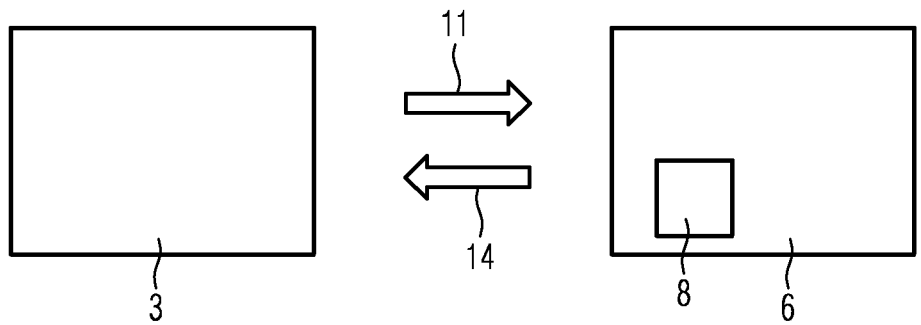

FIG. 4 illustrates a further alternative embodiment of the communication between the smart card controller 3 and the display driver 6. The smart card controller 3 sends the message m to the display driver 6, as indicated by the arrow 11. The display driver 6 drives the display 7 such that the display 7 displays the display information of message m. Before, after or simultaneously to driving the display 7, the display driver 6 stores the message m in its memory 8. Furthermore, the display driver 6 stores the history of received messages in its memory 8. For this exemplary embodiment however, the display driver 3 calculates the history based on the message $m_{old}$ directly received before the current message m. This history may be calculated, for instance, by a collision resistant one-way-function:

$$history = f(m_{old}, history_{old}).$$

From this history, the display driver 6 calculates a function $f(m, history)$, which includes information about the currently received message m. Directly before the display driver 6 sends the value of the function $f(m, history)$, it calculates the history from the message $m_{old}$ and history, which are already stored in its memory 8. The advantage of this embodiment is that direct attacks on the message in the memory 8 after the history's calculation would be detected. The transmission of the history is indicated by an arrow 14 in FIG. 4.

If the driver display 6 replies after each message received form the smart card controller 3 directly with the history, the second use of the function can be neglected. That means, that the actual message m does not influence the actual history, but an attack on this message m would be detected during a later communication. Thus, the display driver 6 does not transmit the value of the function $f(m, history)$ to the smart card controller 3, but only the history=$f(m_{old}, history_{old})$.

Finally, it should be noted that the aforementioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A method of operating a smart card, comprising:
   sending a current message from a first device of the smart card to a second device of the smart card;
   receiving the current message at the second device;
   generating, at the second device, a first history value utilizing a first function which calculates the first history value from both a history of messages previously received at the second device from the first device and the current message;
   storing the first history value in a memory of the second device;
   comparing the first history value with a second history value generated at the first device, the second history value utilizing a second function based on a history of messages previously sent from the first device to the second device, wherein the first function and the second function are identical collision resistant one-way functions; and
   generating a signal to indicate alteration of the current message if the first history value is different from the second history value.

2. The method of claim 1, further comprising:
   sending the first history value from the second device to the first device and comparing the first and second history values at the first device; or
   sending the second history value from the first device to the second device and comparing the first and second history values at the second device.

3. The method of claim 1, wherein the memory is a non-volatile memory, the second device is formed by a single integrated circuit including the memory but not the first device, the first device is a first microcontroller, the second device is a display driver, operatively coupled to a display and the message includes display information to be displayed by the display.

4. The method of claim 1, comprising, in response to the generated signal:
   displaying information about having detected that the history of the messages previously received at the second device differs from the history of messages previously sent from the first device;
   resetting the smart card;
   conveying information about having detected that the history of the messages previously received at the second device differs from the history of messages previously sent from the first device; and
   aborting a communication of the smart card with a third device external to the smart card.

5. The method of claim 1, wherein the smart card comprises:
   a smart card controller as the first device;
   a communication interface operatively coupled to the smart card controller, wherein the communication interface is configured to communicate with a reader;
   a display; and
   a display driver as the second device operatively coupled to the display; the method particularly further comprising a plurality of write cycles during a communication of the smart card with the reader, wherein the message includes display information of one of the write cycles of the plurality of write cycles to be displayed on the display.

6. A smart card comprising:
   first and second devices, wherein the first device is configured to send a current message to the second device; and
   a memory embedded in the second device, wherein the second device is configured to generate a first history value utilizing a first function which calculates the first history value from both a history of messages previously received at the second device from the first device and the current message and to store the first history value in its memory, the first device is configured to generate a second history value utilizing a second function based on a history of messages previously sent from the first device to the second device, the first function and the second function are identical collision resistant one-way functions, and the smart card is configured to generate a signal to indicate alteration of the message if the first history value is different from the second history value.

7. The smart card of claim 6, wherein the second device is configured to send the first history value to the first device and the first device is configured to compare the first and second history values, or the first device is configured to send the second value to the second device and the second device is configured to compare the first and second history values.

8. The smart card of claim 6, wherein the memory is a non-volatile memory, the second device is formed by a single integrated circuit including the memory but not the first device, the first device is a first microcontroller; the second device is a display driver operatively coupled to a display, and the message includes display information to be displayed by the display.

9. The smart card of claim 6, configured, in response to the generated signal, to display information about having detected a difference between the first and second history functions, to reset the smart card, to convey information about having detected a difference between the first and second history functions, and to abort a communication of the smart card with a third device external to the smart card.

10. The smart card of claim 6, comprising:
a smart card controller as the first device;
a communication interface operatively coupled to the smart card controller, wherein the communication interface is configured to communicate with a reader;
a display; and
a display driver as the second device operatively coupled to the display, wherein the smart card is particularly configured to execute a plurality of write cycles during a communication with the reader and the message includes display information of one of the write cycles of the plurality of write cycles to be displayed on the display.

11. The method of claim 1, wherein the second device is a keyboard controller.

12. The method of claim 1, wherein the second device is a fingerprint sensor controller.

13. The smart card of claim 6, wherein the second device is a keyboard controller.

14. The smart card of claim 6, wherein the second device is a fingerprint sensor controller.

15. The method of claim 1, wherein the memory is non-volatile.

16. The method of claim 1, wherein the memory is an EEPROM.

17. The method of claim 1, further comprising:
initiating, if the first history value is different from the second history value, a complete service denial.

18. The method of claim 1, further comprising:
initiating, if the first history value is different from the second history value, a temporary service denial.

* * * * *